US009142983B2

(12) United States Patent
Kitajima et al.

(10) Patent No.: US 9,142,983 B2
(45) Date of Patent: Sep. 22, 2015

(54) BATTERY PROTECTION IC AND BATTERY DEVICE

(75) Inventors: Yuichiro Kitajima, Chiba (JP); Naoto Kobayashi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 526 days.

(21) Appl. No.: 13/553,174

(22) Filed: Jul. 19, 2012

(65) Prior Publication Data

US 2013/0026995 A1    Jan. 31, 2013

(30) Foreign Application Priority Data

Jul. 26, 2011    (JP) .................................. 2011-162902

(51) Int. Cl.
| | |
|---|---|
| H01M 2/34 | (2006.01) |
| H02J 7/00 | (2006.01) |
| H01M 10/42 | (2006.01) |
| H01M 10/48 | (2006.01) |
| H01M 10/46 | (2006.01) |

(52) U.S. Cl.
CPC .............. *H02J 7/0029* (2013.01); *H01M 2/342* (2013.01); *H01M 10/425* (2013.01); *H01M 10/48* (2013.01); *H02J 7/0034* (2013.01); *H01M 10/46* (2013.01); *H02J 2007/004* (2013.01); *H02J 2007/0037* (2013.01); *H02J 2007/0039* (2013.01)

(58) Field of Classification Search
CPC ....... H02J 7/0072; H02J 7/009; H02J 7/0052; H02J 7/0054; H02J 7/0086; H02J 7/007; H02J 7/0059; H02J 7/00; H02J 7/0016; H02J 7/04; H02J 2007/0037; H02J 2007/0039; H02J 2007/004; H02J 7/0022; H02J 7/0026; H02J 7/0031; B60L 11/1809; B60L 11/1864; Y02T 10/7044; Y02T 10/7088; H02H 7/18; H01M 2010/4271; H01M 10/44; H01M 2220/20; H01M 2200/00
USPC ......... 320/107, 108, 134, 136, 152, 157, 158, 320/159, 162, 163, 164, 165; 361/79, 86, 361/87, 93.1, 93.9, 98; 307/127
See application file for complete search history.

(56) References Cited

U.S. PATENT DOCUMENTS

| | | | |
|---|---|---|---|
| 7,456,614 B2* | 11/2008 | Sato et al. ...................... | 320/134 |
| 7,928,695 B2* | 4/2011 | Liu et al. ........................ | 320/134 |
| 8,072,189 B2* | 12/2011 | Sakurai et al. ................. | 320/165 |
| 8,212,528 B2* | 7/2012 | Takeda ........................... | 320/134 |
| 8,581,556 B2* | 11/2013 | Shibata et al. ................. | 320/134 |
| 2009/0197156 A1* | 8/2009 | Goto ............................... | 429/93 |

FOREIGN PATENT DOCUMENTS

JP    2009-177937 A    8/2009

* cited by examiner

*Primary Examiner* — Drew A Dunn
*Assistant Examiner* — Harry O'Neill-Becerril
(74) *Attorney, Agent, or Firm* — Brinks Gilson & Lione

(57) ABSTRACT

Provided are a battery protection IC and a battery device, which are capable of ensuring safety even when a charger is connected in a reverse direction. The battery protection IC includes a first switch element provided between an overcurrent detection terminal and a VDD terminal so that, when the charger is connected with reverse polarity, the first switch element interrupts a current path between the overcurrent detection terminal and the VDD terminal. The battery protection IC further includes a second switch element provided between a charge control terminal and the VDD terminal so that, when the charger is connected with reverse polarity, the second switch element interrupts a current path between the charge control terminal and the VDD terminal.

6 Claims, 3 Drawing Sheets

BATTERY PROTECTION IC AND BATTERY DEVICE

RELATED APPLICATIONS

This application claims priority under 35 U.S.C. §119 to Japanese Patent Application No. 2011-162902 filed on Jul. 26, 2011, the entire content of which is hereby incorporated by reference.

BACKGROUND OF THE INVENTION

1. Field of the Invention

The present invention relates to a battery protection IC and a battery device, and more particularly, to protection of an IC when a charger is connected to a battery device in a reverse direction.

2. Description of the Related Art

Nowadays, portable electronic devices have become widespread, and those devices are driven by a battery device. The battery device includes a secondary battery and a battery protection IC incorporating a protection circuit for controlling charge/discharge of the secondary battery. The battery protection IC has the function of controlling the charge/discharge of the secondary battery and also the function of protecting the secondary battery from an overcharge, an overdischarge, and an overcurrent. Further, the battery protection IC has another function of protecting the secondary battery and an IC even when a charger for charging the secondary battery is connected with reverse polarity to that in normal connection.

FIG. 2 is a block diagram illustrating a battery protection IC 3 and a battery device 1.

The battery device 1 includes a secondary battery 2, the battery protection IC 3, a discharge control FET 4 and a charge control FET 5 serving as switches, a capacitor 6, an input resistor 7, a current limiting resistor 8, and external terminals 11 and 12 to be connected to a charger 13 or a load. The battery protection IC 3 includes an overdischarge detection circuit 31, an overcharge detection circuit 32, an overcurrent detection circuit 33, a control circuit 34, a VDD terminal 15, a VSS terminal 16, a CO terminal 17 for charge control, a DO terminal 18 for discharge control, and a VM terminal 19 for overcurrent detection.

The secondary battery 2 has a positive terminal connected to the VDD terminal 15 of the battery protection IC 3 via the input resistor 7, and a negative terminal connected to the VSS terminal 16 of the battery protection IC 3. The capacitor 6 is connected to the VDD terminal 15 and the VSS terminal 16 of the battery protection IC 3. The discharge control FET 4 and the charge control FET 5 are connected in series between the negative terminal of the secondary battery 2 and the external terminal 12 of the battery device 1. The discharge control FET 4 has a gate connected to the discharge control terminal DO of the battery protection IC 3. The charge control FET 5 has a gate connected to the charge control terminal CO of the battery protection IC 3. The discharge control FET 4 and the charge control FET 5 are each provided with a gate oxide film protection diode between its gate and source. The current limiting resistor 8 is connected between the VM terminal 19 of the battery protection IC 3 and the external terminal 12.

The overdischarge detection circuit 31 and the overcharge detection circuit 32 each have input terminals connected to the VDD terminal 15 and the VSS terminal 16, and an output terminal connected to the control circuit 34. The overcurrent detection circuit 33 has input terminals connected to the VM terminal 19 and the VSS terminal 16, and an output terminal connected to the control circuit 34 (see, for example, Japanese Patent Application Laid-open No. 2009-177937).

FIG. 3 is a circuit diagram illustrating parasitic diodes of the conventional battery protection IC 3.

The parasitic diodes of the battery protection IC 3 are typically parasitic capacitances of transistors in the circuit. For example, a parasitic diode D1 is present between the VM terminal 19 and the VDD terminal 15. Further, parasitic diodes D2, D3, and D4 are present between the CO terminal 17 and the VDD terminal 15. Still further, parasitic diodes D5 and D6 are present between the DO terminal 18 and the VDD terminal 15.

The charger 13 outputs a high voltage of about 30 V. The charger 13 is connected so that a high potential is connected to the external terminal 11 side of the battery device 1 and a low potential is connected to the external terminal 12 side of the battery device 1.

When the charger 13 is connected to the battery device 1 in the reverse direction, an abnormal current is generated in the battery device 1 in the following current paths.

First, the parasitic diode present between the VM terminal 19 and the VDD terminal 15 is connected in the forward direction, and a current flows in a path from the charger 13 to the current limiting resistor 8, the VM terminal 19, the parasitic diode D1 (D3 and D4), the input resistor 7, and the charger 13 in this order.

Next, a gate oxide film protection diode of the charge control FET 5 operates so as to clamp a potential difference between the gate and the source of the charge control FET 5. Accordingly, the parasitic diode connected to the CO terminal 17 of the battery protection IC 3 is connected in the forward direction, and a current flows in a path from the charger 13 to the gate oxide film protection diode of the charge control FET 5, the CO terminal 17, the parasitic diode D4, the input resistor 7, and the charger 13 in this order.

When those currents flow, a voltage is generated across the input resistor 7, and hence a voltage exceeding a rated voltage is applied between VDD and VSS of the battery protection IC 3.

In this case, the current limiting resistor 8 connected to the VM terminal 19 of the battery protection IC 3 suppresses a current when the charger 13 is connected in the reverse direction. Further, a resistor R1 provided in the path from the CO terminal 17 to the VDD terminal 15 also suppresses a current when the charger 13 is connected in the reverse direction. In this way, the current limiting resistors are provided in the internal current paths, to thereby suppress the current when the charger 13 is connected in the reverse direction.

However, the battery protection IC 3 and the battery device 1 described above need the current limiting resistor 8, and hence there is a problem that the number of external components of the battery protection IC 3 increases.

Further, the internal current limiting resistor has a tradeoff relationship to the influence on the normal operation of the battery protection IC 3, and hence there is a problem that the resistance value thereof cannot be increased unnecessarily.

SUMMARY OF THE INVENTION

In order to solve the problems described above, the battery protection IC of the present invention is configured as follows.

The battery protection IC includes a first switch element provided between an overcurrent detection terminal and a VDD terminal so that, when a charger is connected with reverse polarity, the first switch element interrupts a current path between the overcurrent detection terminal and the VDD terminal.

The battery protection IC further includes a second switch element provided between a charge control terminal and the VDD terminal so that, when the charger is connected with reverse polarity, the second switch element interrupts a current path between the charge control terminal and the VDD terminal.

According to the battery protection IC and the battery device of the present invention, the switch element for interrupting a current when the charger is connected in the reverse direction is provided in the battery protection IC. Therefore, it is possible to provide the battery protection IC and the battery device having the reduced number of components of the battery device and high safety.

DETAILED DESCRIPTION OF THE PREFERRED EMBODIMENT

Hereinafter, an exemplary embodiment of the present invention is described in detail with reference to the accompanying drawings.

Figure 1:
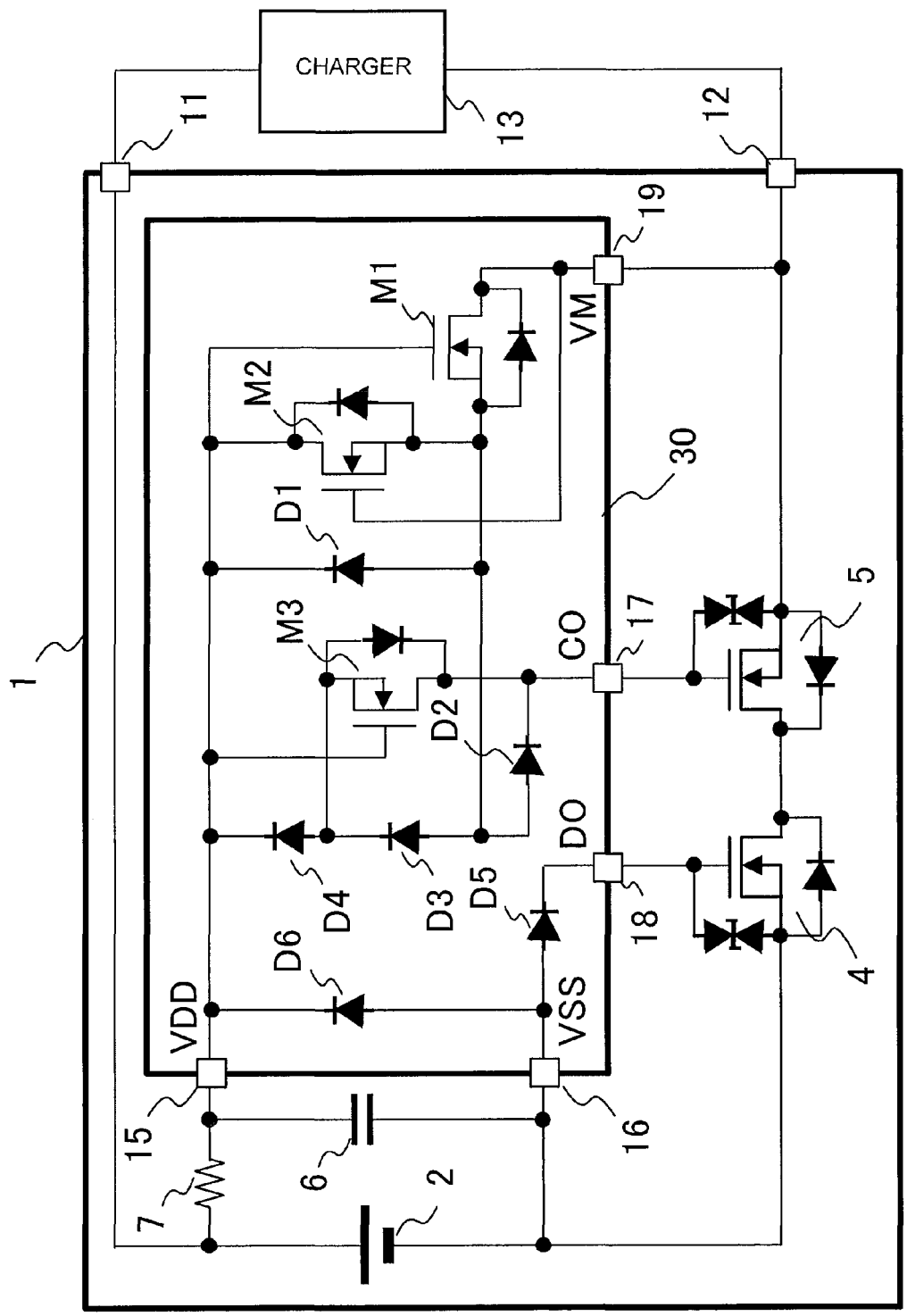
FIG. 1 is a block diagram illustrating a battery protection IC and a battery device according to an embodiment of the present invention.

FIG. 1 is a block diagram illustrating a battery protection IC and a battery device according to the embodiment of the present invention.

Figure 2:
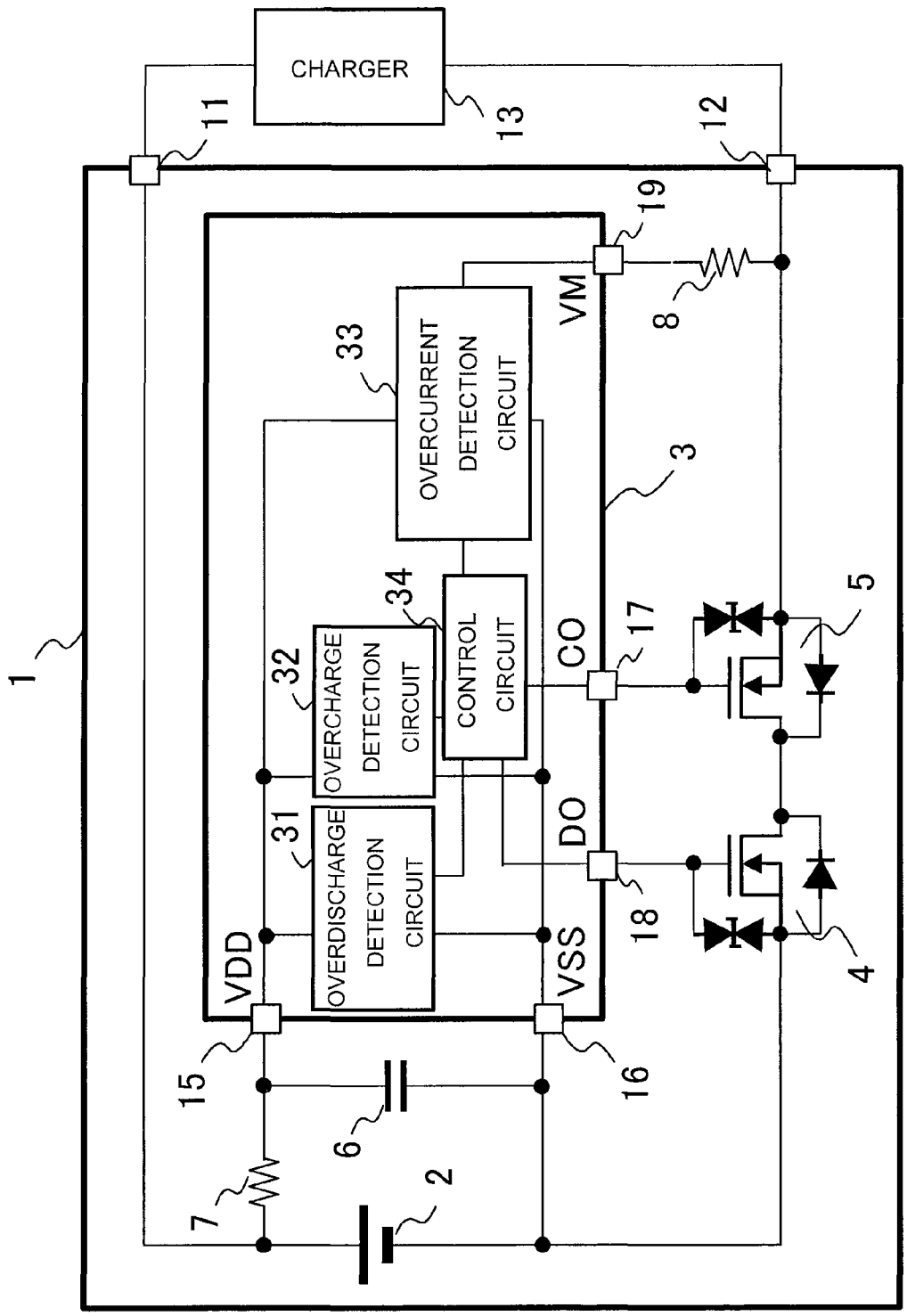
FIG. 2 is a block diagram illustrating a conventional battery protection IC and a conventional battery device.
Figure 3:
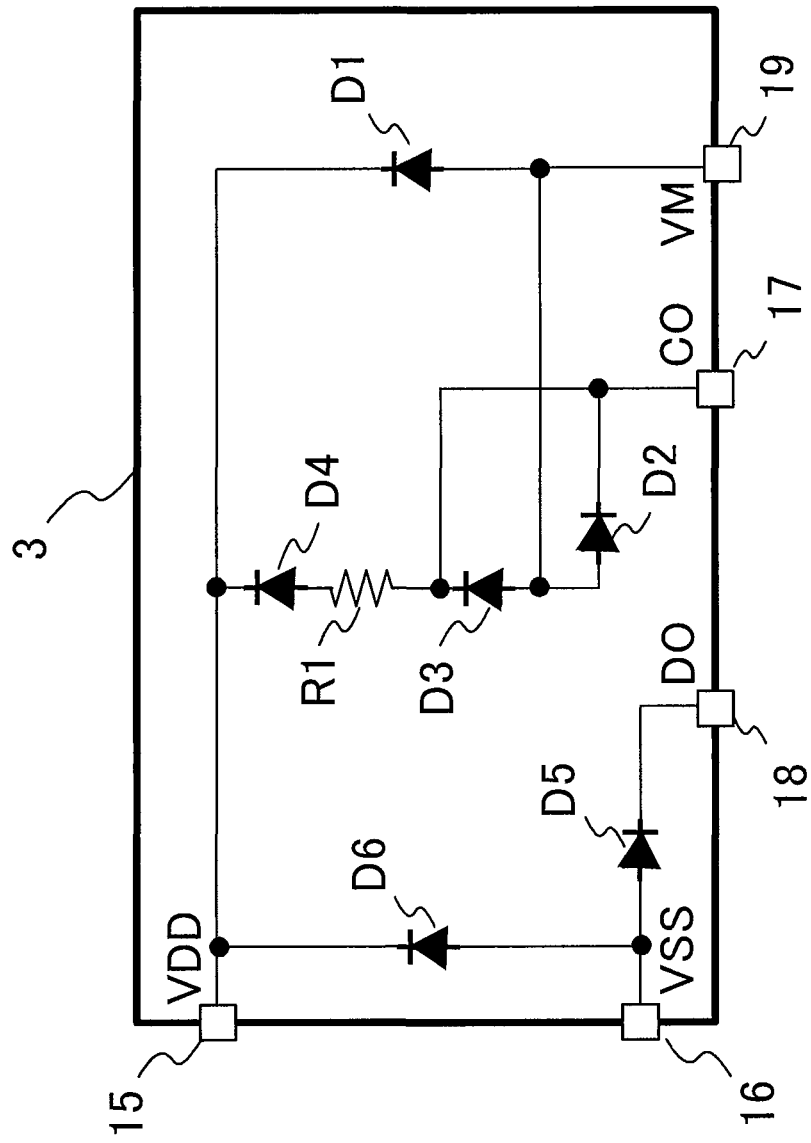
FIG. 3 is a block diagram illustrating parasitic diodes of the conventional battery protection IC.

A battery device 1 includes a secondary battery 2, a battery protection IC 30, a discharge control FET 4 and a charge control FET 5 serving as switches, a capacitor 6, an input resistor 7, and external terminals 11 and 12 to be connected to a charger 13 or a load. The battery protection IC 30 includes a VDD terminal 15, a VSS terminal 16, a CO terminal 17 for charge control, a DO terminal 18 for discharge control, and a VM terminal 19 for overcurrent detection. Although not illustrated, the battery protection IC 30 further includes, similarly to FIG. 2, an overdischarge detection circuit 31, an overcharge detection circuit 32, an overcurrent detection circuit 33, and a control circuit 34. Due to the presence of those circuits, an ESD protection element, and the like, for example, parasitic diodes D1, D2, D3, D4, D5, and D6 are present. The battery protection IC 30 further includes transistors M1, M2, and M3.

The secondary battery 2 has a positive terminal connected to the VDD terminal 15 of the battery protection IC 30 via the input resistor 7, and a negative terminal connected to the VSS terminal 16 of the battery protection IC 30. The capacitor 6 is connected to the VDD terminal 15 and the VSS terminal 16 of the battery protection IC 30. The discharge control FET 4 and the charge control FET 5 are connected in series between the negative terminal of the secondary battery 2 and the external terminal 12 of the battery device 1. The discharge control FET 4 has a gate connected to the discharge control terminal DO of the battery protection IC 30. The charge control FET 5 has a gate connected to the charge control terminal CO of the battery protection IC 30. The discharge control FET 4 and the charge control FET 5 are each provided with a gate oxide film protection diode between its gate and source. The VM terminal 19 is connected directly to the external terminal 12.

The parasitic diode D1 is connected between the VM terminal 19 and the VDD terminal 15. The parasitic diode D2 is connected between the VM terminal 19 and the CO terminal 17. The parasitic diodes D3 and D4 are connected between the VM terminal 19 and the VDD terminal 15. A connection point between the parasitic diode D3 and the parasitic diode D4 is connected to the CO terminal 17. The parasitic diode D5 is connected between the VSS terminal 16 and the DO terminal 18. The parasitic diode D6 is connected between the VSS terminal 16 and the VDD terminal 15.

The transistor M1 as a switching element has a drain and a source connected between the VM terminal 19 and the VDD terminal 15 and between the VM terminal 19 and the DO terminal 18, and a gate connected to the VDD terminal 15. The transistor M2 has a drain and a source connected between the VDD terminal 15 and the source of the transistor M1, and a gate connected to the VM terminal 19. The transistor M3 as a switching element has a drain and a source connected between the CO terminal 17 and the VDD terminal 15, and a gate connected to the VDD terminal 15.

Next, the operation of the battery device 1 according to the embodiment of the present invention is described. When the secondary battery 2 is a single cell, the secondary battery 2 has a voltage of about 5 V, and a potential difference of about 10 V is generated across output terminals of the charger 13.

First, the case where the charger 13 is connected to the battery device 1 normally is described.

When the charger 13 is connected normally, a charge current for charging the secondary battery 2 flows in a path from the external terminal 11 to the secondary battery 2, the discharge control FET 4, the charge control FET 5, and the external terminal 12 in this order. In this state, the potential of the VSS terminal 16 and the potential of the VM terminal 19 become substantially equal to each other. Therefore, the transistor M1 has a gate voltage of VDD and a drain voltage of VSS, and is accordingly turned ON. Further, the transistor M2 has a gate voltage of VSS and a drain voltage of VDD, and is accordingly turned OFF. Therefore, the transistor M3 has a gate voltage of VDD, and is accordingly turned ON.

The transistors M1 to M3 in those states do not affect the normal operation of the battery protection IC 30. For example, the overcharge detection circuit 31 outputs an overcharge detection signal to the control circuit 34 when the voltage of the secondary battery 2 has exceeded a predetermined voltage. Then, the control circuit 34 turns OFF the charge control FET 5 to stop the charge by the charger 13.

Next, the case where the charger 13 is connected to the battery device 1 in the reverse direction is described.

When the charger 13 is connected in the reverse direction, the voltage of the VM terminal 15 becomes higher, and hence the overcurrent detection circuit 33 detects an overcurrent and turns OFF the discharge control FET 4 and the charge control FET 5. When the discharge control FET 4 is turned OFF, the battery device 1 does not allow a current to flow, and hence the voltage of 10 V of the charger 13 is applied between the VM terminal and the VDD terminal.

In this case, a first current path via the parasitic diode D1 and via the parasitic diodes D3 and D4 is present between the VM terminal 19 and the VDD terminal 15. Further, when the gate oxide film protection diode of the charge control FET 5 is broken down, a second current path via the parasitic diode D4 is present between the CO terminal 17 and the VDD terminal 15.

Accordingly, in the battery protection IC 30, the transistor M1 is provided in the first current path, and the transistor M3 is provided in the second current path, to thereby interrupt those current paths.

The gate of the transistor M1 is connected to the VDD terminal 15, and the voltage of the VM terminal 19 is VDD+ 10 V, and hence the transistor M1 is turned OFF. The gate of the transistor M2 is connected to the VM terminal 19, and hence the transistor M2 is turned ON to change the source voltage of the transistor M1 to VDD. Through the operation described above, the battery protection IC 30 can interrupt the first current path.

The gate of the transistor M3 is connected to the VDD terminal 15, and the voltage of the CO terminal 17 is VDD+10 V, and hence the transistor M3 is turned OFF. Therefore, the battery protection IC 30 can interrupt the second current path.

As described above, even when the charger 13 is connected to the battery device 1 in the reverse connection, the current paths can be interrupted by the actions of the transistors M1 to M3. It is therefore unnecessary to provide the current limiting resistor 8 or an internal resistor, which has been conventionally connected to the VM terminal 19, and high safety can be ensured.

Now, the characteristics required for the transistors M1 to M3 are described.

The transistor M1 needs to have an internal potential equal to the potential of the VM terminal 19 so that the transistor M1 does not affect the precision of the voltage for detecting an overcurrent in the normal operation. Therefore, the transistor M1 is required to have a low ON-state resistance. Further, when the charge control FET 5 is turned OFF, the voltage of the charger 13 is applied between the gate, and the source and the drain, and hence the gate oxide film is required to be sufficiently thick and the drain is required to have a high voltage structure.

The transistor M2 is always turned OFF in the normal operation, and hence the transistor M2 is required to prevent the occurrence of an OFF-state leakage current by, for example, increasing a threshold voltage. Further, when the charge control FET 5 is turned OFF, the voltage of the charger 13 is applied between the source and the drain, and hence the drain is required to have a high voltage structure. Still further, when the charger 13 is connected in the reverse direction, the voltage of the charger 13 is applied to the gate, and hence the gate oxide film is required to be sufficiently thick.

When the charge control FET 5 is turned OFF, the CO terminal 17 has the same potential as that of the VM terminal 19, and the voltage of the charger 13 is applied to the gate of the transistor M3. Therefore, the gate oxide film is set to be sufficiently thick. Further, when the charger 13 is connected in the reverse direction, the voltage of the charger 13 is applied between the gate, and the source and the drain, and hence the gate oxide film is required to be sufficiently thick and the drain is required to have a high voltage structure.

Note that, the transistor M2 may serve also as an electrostatic protection element with respect to the VM terminal 19 of the battery protection IC 30.

In this way, according to the battery protection IC 30 and the battery device 1 of the present invention, even when the charger 13 is connected in the reverse direction, no current flows through the battery device 1 as well as the battery protection IC 30. It is therefore possible to provide the high safety battery protection IC and the high safety battery device without connecting an external resistor which has been conventionally needed.

What is claimed is:

1. A battery protection IC for monitoring a voltage and a current of a secondary battery to control charge/discharge of the secondary battery, the battery protection IC comprising:
   a VDD terminal and a VSS terminal to be connected to the secondary battery;
   an overcurrent detection terminal to be connected to an external terminal;
   a charge control terminal to be connected to a charge control FET for controlling a charge current of a charger for charging the secondary battery; and
   a first switch element provided in a current path that exists between the overcurrent detection terminal and the VDD terminal, the first switch comprising a first node and a second node, wherein when the first switch is in an on state, current flows between the first node and the second node,
   wherein, when the charger is connected with reverse polarity, the first switch element switches to an off state and blocks current flow between the first node and the second node, which thereby blocks current flow into the overcurrent detection terminal and out through the VDD terminal.

2. A battery protection IC according to claim 1, wherein the first switch element comprises an NMOS transistor including a drain connected to the overcurrent detection terminal and a gate connected to the VDD terminal.

3. A battery protection IC according to claim 2, further comprising a second NMOS transistor including a source connected to a source of the first switch element, a drain connected to the VDD terminal, and a gate connected to the overcurrent detection terminal.

4. A battery protection IC according to claim 1, further comprising a second switch element provided between the charge control terminal and the VDD terminal,
   wherein, when the charger is connected with reverse polarity, the second switch element interrupts a current path between the charge control terminal and the VDD terminal.

5. A battery protection IC according to claim 4, wherein the second switch element comprises an NMOS transistor including a drain connected to the charge control terminal and a gate connected to the VDD terminal.

6. A battery device, comprising:
   a first external terminal and a second external terminal to be connected to a charger;
   a secondary battery, a discharge control FET, and the charge control FET which are connected in series between the first external terminal and the second external terminal; and
   the battery protection IC according to claim 1, to which a voltage of the secondary battery and a voltage of the second external terminal are input, for controlling charge/discharge of the secondary battery.

* * * * *